Aug. 5, 1958
C. WILLIAMS
2,846,236
ADJUSTABLE DRAW BEAM
Filed Aug. 15, 1956
2 Sheets-Sheet 1
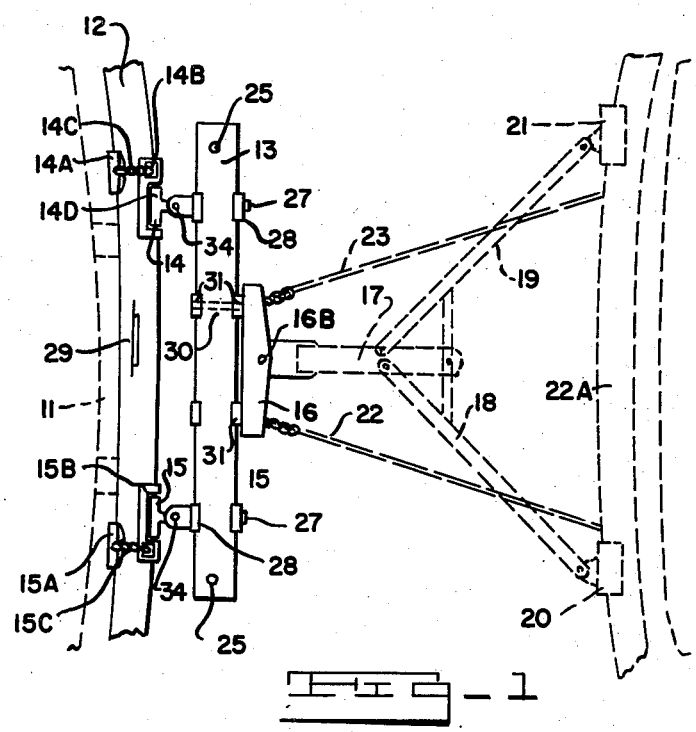
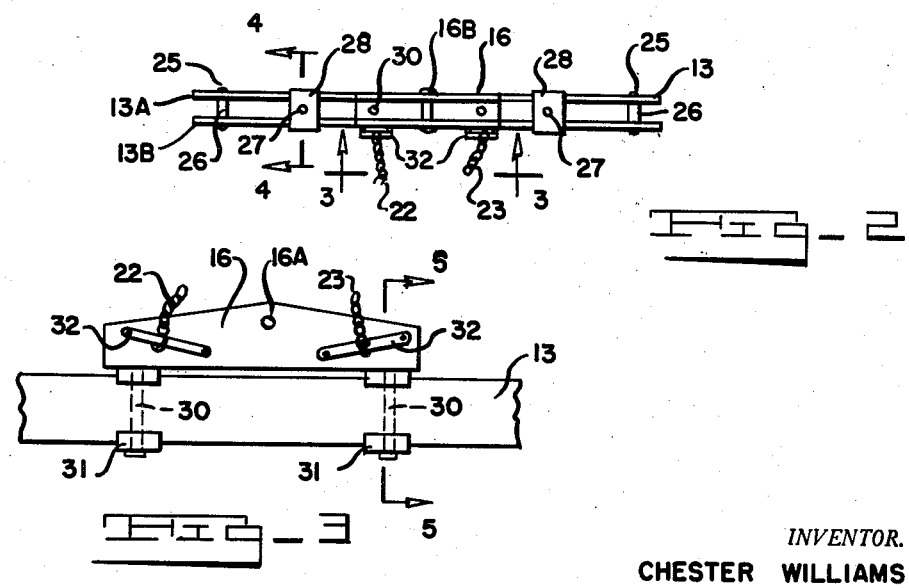
INVENTOR.
CHESTER WILLIAMS
BY Edward M. Apple
ATTORNEY

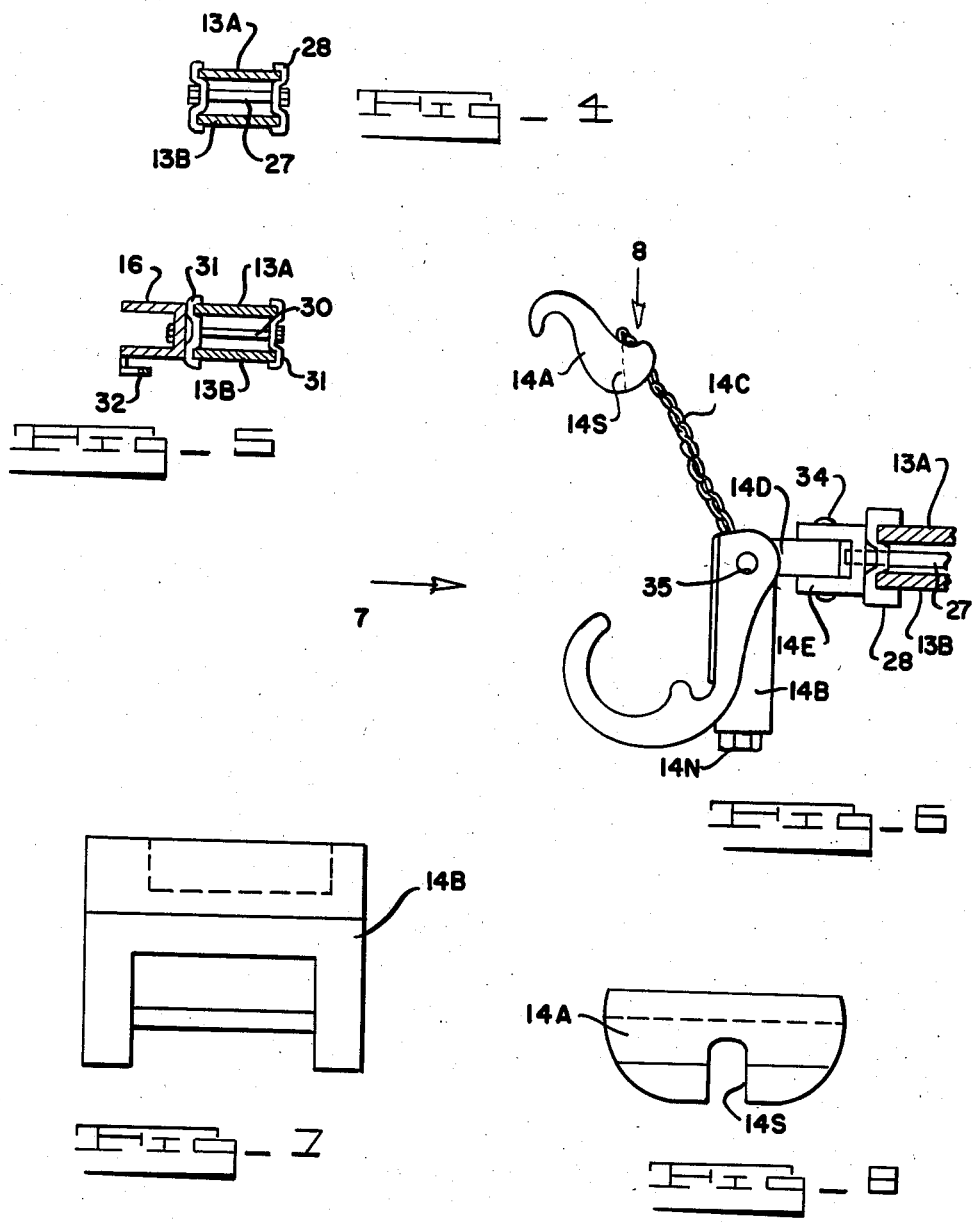

United States Patent Office 2,846,236
Patented Aug. 5, 1958

2,846,236

ADJUSTABLE DRAW BEAM

Chester Williams, Ypsilanti, Mich.

Application August 15, 1956, Serial No. 604,258

6 Claims. (Cl. 280—442)

This invention relates to automobile tow bars and has particular reference to a draw beam, which comprises one of the principal parts of a bumper to bumper tow bar assembly.

An object of the invention is to generally improved bumper to bumper tow bars, and to provide a draw beam for such tow bars, which is flexible to a degree, light in weight, readily portable, easy to attach and detach, and one which is adjustable for all types of automobile bumpers.

Another object of the invention is to provide a device of the character indicated, which may be attached to the bumper of a towing automobile, without the necessity of removing the license plate, the license plate bracket, or bumper guards, which are carried as standard equipment on the bumpers of many conventional automobiles.

Another object of the invention is to provide a draw beam for a bumper to bumper tow bar, which is constructed and arranged, so that it may be readily attached to any conventional automobile bumper, regardless of its contour, or cross-sectional structure.

In as much as bumper to bumper tow bars are employed extensively by automobile dealers, to tow new and used cars from place to place, it is important that they be kept as light as possible for easy portability. The draw beams of towbars heretofore known to the public have of necessity been formed of heavy metals, in order to safely withstand the stresses of pull, when in use, as required by the Interstate Commerce Commission. Such draw beams add greatly to the over all weight of the tow bar, and are constructed and arranged so that it is impossible to attach them to certain types of bumpers, without removing the license plate bracket, bumper guards, and other parts attached to the bumper. Further than that, previously known draw beams were of such size and construction, that often times they would exert unnatural stresses on the bumpers of the towing vehicle, and pull them out of shape.

It is therefore an object of this invention to obviate the foregoing difficulties by the provision of the draw beam, constructed and arranged as hereinafter disclosed.

The foregoing and other objects and advantages of the invention will become more apparent as the description proceeds, reference being made from time to time to the accompanying drawing forming part of the within disclosure, in which drawing:

Fig. 1 is a plan view of a device embodying the invention. In this view the draw beam, and the rear bumper of the towing vehicle, to which it is attached, are shown in solid lines, and the front bumper of the vehicle being towed, together with certain elements of the tow bar assembly, are shown in dotted lines.

Fig. 2 is a rear view of the draw beam embodying the invention, detached from the tow bar assembly.

Fig. 3 is a bottom plan view of the draw beam viewed along the line 3—3 of Fig. 2.

Fig. 4 is a section taken substantially on the line 4—4 of Fig. 2.

Fig. 5 is a section taken substantially on the line 5—5 of Fig. 3.

Fig. 6 is an enlarged detail (partly in section) illustrating the construction and arrangement of one of the clamps use in attaching the draw beam to the bumper of the towing vehicle.

Fig. 7 is a front elevational view, looking in the direction of the arrow 7 in Fig. 6, of the lower member of the clamp illustrated in Fig. 6.

Fig. 8 is a plan view, looking in the direction of the arrow 8 in Fig. 6, of the top member of the clamp illustrated in Fig. 6.

Referring now more particularly to the drawing, it will be understood that in the embodiment herein disclosed, the reference character 11 indicates the body of a motor vehicle, having a rear bumper 12, to which is secured the draw beam 13, which is secured to the bumper 12 by means of right and left clamps 14 and 15. The draw beam 13 has secured to it a channel shaped yoke 16, to which is pivoted the pull bar 17 of the tow bar, to which in turn is attached the divergent arms 18 and 19, and the bumper clamps 20 and 21, which attach the tow bar to the bumper 22A of the vehicle being towed. The reference characters 22 and 23 indicate the steering chains of the tow bar assembly, which are secured, at one end, to the yoke 16, and at the other end, to the steering mechanism of the vehicle being towed.

The invention resides in the combination and arrangement of the parts illustrated in solid lines. It will be understood that the draw beam 13 consists of two pieces of tempered spring steel 13A and 13B, each of which is approximately 1¾ inches wide, ¼ of an inch thick, and 36 inches long. These pieces of tempered spring steel 13A and 13B (Fig. 2), are preferably secured together by bolts 25, or other suitable means, and are held in spaced relation by spacers 26. The members 13A and 13B are positioned, so that the pull on them is edgewise, and in as much as they are made of tempered spring steel, they will provide when in use, a certain degree of flexibility, yet will withstand a pull of at least 10,000 pounds, which is greatly in excess of the requirements of the Interstate Commerce Commission.

The clamps 14 and 15 are secured to the draw beam 13, by means of bolts 27 which extend through the clevises of the clamps and through the lugs 28, which engage the edges of the members 13A and 13B. The lugs 28 may be moved to any desired position along the draw beam 13 so that the clamps 14 and 15 may be attached to the bumper 12 at any desired position, so as not to interfere with the license plate bracket 29, or bumper guards (not shown) which are carried on most present day bumpers.

The attaching clamps 14 and 15 are in pairs for right hand and left hand use and are constructed and arranged in a novel manner, and are more particularly described and specifically claimed in my co-pending application, Serial No. 604,257, filed August 15, 1956, to which reference is made for greater certainty. In general, the clamps consist of upper jaws 14A, 15A, lower jaws 14B, 15B, chains 14C, 15C (Fig. 6), a free block 14D and a clevis 14E.

The yoke 16 is preferably made in the form of a hot rolled, pressed channel and is secured to the draw beam 13, by means of bolts 30, which extend through holes in the web of the yoke and through holes in the lugs 31, which ride against the opposite edges of the members 13A and 13B, of the draw beam 13. The yoke 16 is provided on its under side (Fig. 3) with angularly positioned loops 32, to which are slidably secured the ends of steering chains 22 and 23. The yoke 16 is provided with an opennig 16A (Fig. 3) for receiving a pin 16B (Fig. 1) for attaching thereto the pull bar 17.

When the device is to be attached to the bumper of a towing vehicle, the clamps 14 and 15 are moved along the draw beam 13, until they are positioned so as not to interfere with the license plate, or bumper guards on the bumper 12. The bolts 27 are then tightened and the clamps 14 and 15 are secured to the bumper 12 as follows. The upper jaws 14A and 15A of the clamps are first positioned on the upper edge of the bumper 12. The lower jaw 14B and 15B are then secured to the lower edge of the bumper 12, and the chains 14C and 15C are then extended from the members 14B and 15B to the members 14A and 15A and made secure by engaging a chain link in the slot 14S of the jaw 14A and tighten the nut 14N (Figs. 6 and 8), in the manner more particularly described in my co-pending application hereinabove referred to. The clamps 14 and 15 are designed for universal movement through the pivot points 34 and 35 (Fig. 6).

It is believed that the operation of the device is obvious from the foregoing description.

Having described by invention, what I claim and desire to secure by Letters Patent is:

1. A draw beam for a bumper to bumper tow bar assembly, comprising a pair of comparatively light in weight, parallel, spaced, spring steel members, a channel shaped yoke secured to said spring steel members in edgewise relation, and a pair of clamp jaws secured to and mounted for universal action between the edges of said spring steel members and the bumper of the towing vehicle, said yoke having means thereon for attachment to the bumper of the towed vehicle.

2. The structure of claim 1, in which said clamp jaws have securing means thereon, for permitting longitudinal adjustment on said spring steel members.

3. The structure of claim 1, in which said yoke has securing means thereon for permitting endwise adjustment with respect to said draw beam.

4. The structure of claim 1, in which each of said clamps is secured to the edges of said spring steel members by pairs of lugs, which engage the opposite edges of said spring steel members, said lugs having apertures therein for receiving a bolt attached to said clamp.

5. The structure of claim 1, in which said yoke is provided with an opening in each leg of the channel for receiving a draw bar pin.

6. The structure of claim 1, in which said yoke is provided with angularly positioned loops for receiving the ends of steering chains, forming part of a bumper to bumper tow bar assembly.

References Cited in the file of this patent

UNITED STATES PATENTS

| | | |
|---|---|---|
| 633,333 | Beall | Sept. 19, 1899 |
| 2,002,416 | Shafer | May 21, 1935 |
| 2,120,422 | Williams | June 14, 1938 |
| 2,206,991 | Williams | July 9, 1940 |
| 2,507,265 | Patton | May 9, 1950 |